United States Patent
Rispoli, Sr.

[11] Patent Number: 5,847,883
[45] Date of Patent: Dec. 8, 1998

[54] ADJUSTABLE MAGNIFYING APPARATUS

[76] Inventor: Jerry R. Rispoli, Sr., 1010 S. Ocean Blvd., #1604, Pompano Beach, Fla. 33062-6636

[21] Appl. No.: 908,915
[22] Filed: Aug. 8, 1997
[51] Int. Cl.⁶ .................................................. G02B 27/02
[52] U.S. Cl. .......................... 359/802; 359/817; 359/818
[58] Field of Search ................................... 359/802, 803, 359/809, 810, 811, 817, 818

[56] References Cited

U.S. PATENT DOCUMENTS

| | | | |
|---|---|---|---|
| 354,976 | 12/1886 | Field | 359/818 |
| 2,104,198 | 1/1938 | Jones | 359/802 |
| 2,563,473 | 8/1951 | Levinson | 359/802 |
| 2,641,965 | 6/1953 | Valenza | 359/802 |
| 3,955,884 | 5/1976 | Del Pesco, Sr. | 359/817 |
| 4,051,535 | 9/1977 | Inglin | 358/231 |
| 4,603,944 | 8/1986 | Greenlaw et al. | 359/818 |
| 4,711,527 | 12/1987 | Rimmell et al. | 359/809 |
| 4,885,667 | 12/1989 | Selden | 362/253 |
| 4,958,907 | 9/1990 | Davis | 359/818 |
| 5,267,716 | 12/1993 | Friedman | 248/291 |
| 5,351,424 | 10/1994 | Schulle et al. | 38/102.1 |

Primary Examiner—Loha Ben
Attorney, Agent, or Firm—Oltman, Flynn & Kubler

[57] ABSTRACT

An adjustable magnifying apparatus comprising a generally rectangular-shaped, sheetlike magnifying surface, an adjustable arm having at least one generally hourglass-shaped member with a first end zone having a socket and an opposite, generally parabolic-shaped second end zone, a first coupler having a first end with a slit sized and shaped to removably secure an outer edge of the magnifying surface therein and an opposite, parabolic-shaped second end sized and shaped to be removably captured within the socket of one of the hourglass-shaped members, and a generally C-shaped clamp having a second coupler, structured and disposed to removably capture the parabolic-shaped second end zone of one of the hourglass-shaped members therein, mounted on the upper face. The socket, the parabolic-shaped second end zone of the hourglass-shaped members and the parabolic-shaped second end of the first coupler are sized and shaped so that the parabolic-shaped second end zone of one of the hourglass-shaped members or the parabolic-shaped second end of the first coupler may be removably captured within the socket of one of the hourglass-shaped members. Alternatively, the adjustable arm may be comprised of a torsional member structured so that the upper and lower ends may be adjustably disposed in angular relation to one another.

27 Claims, 2 Drawing Sheets

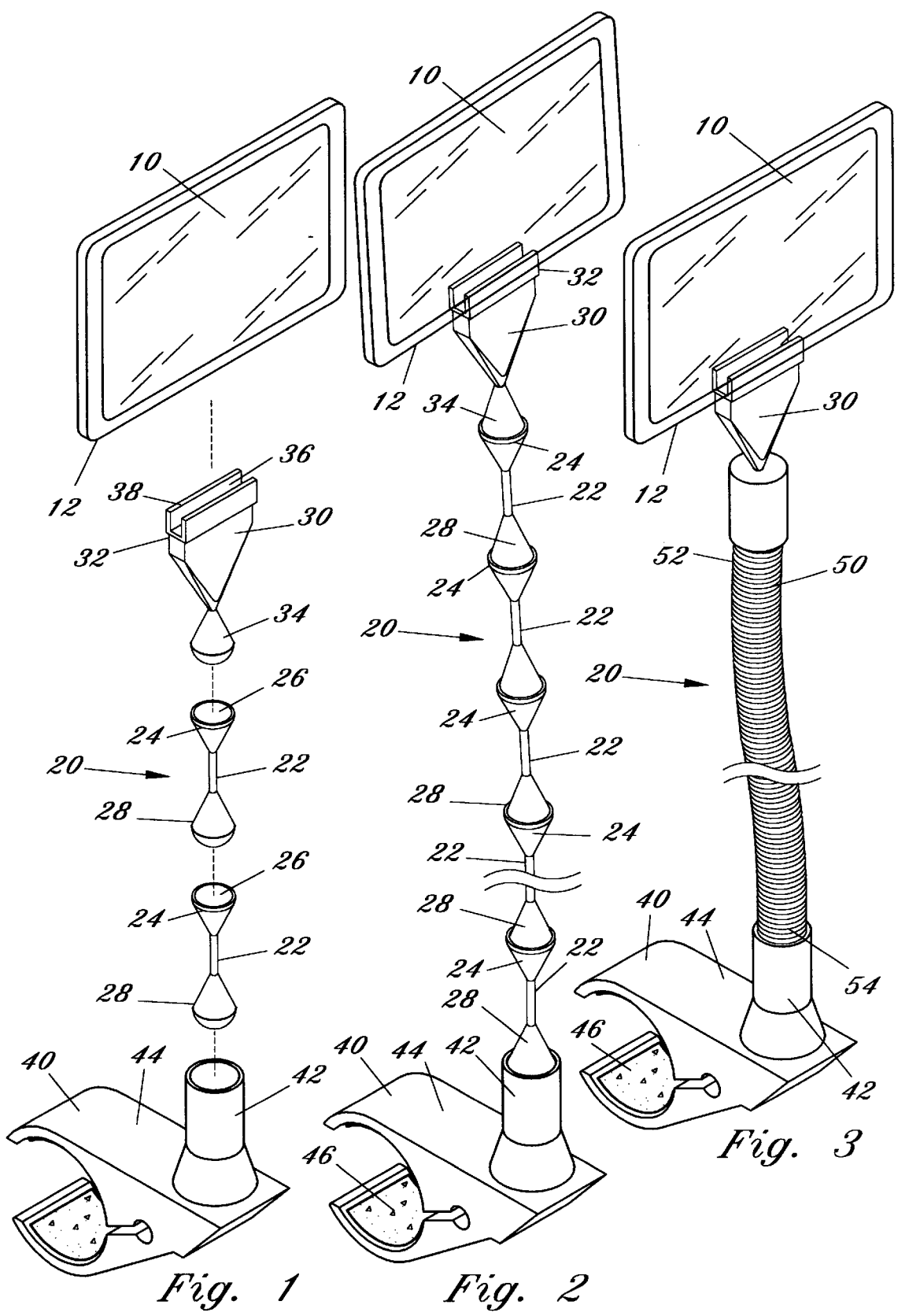

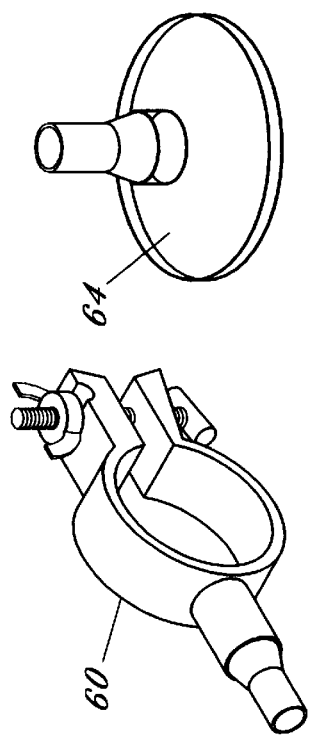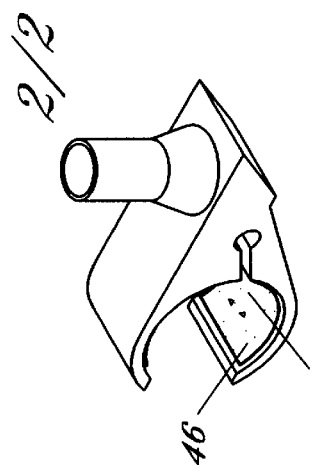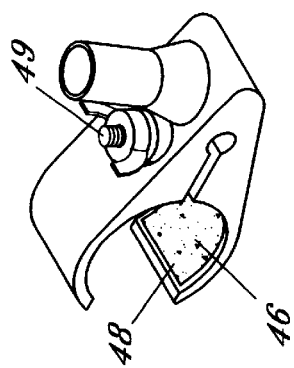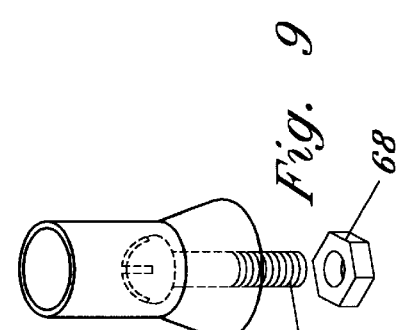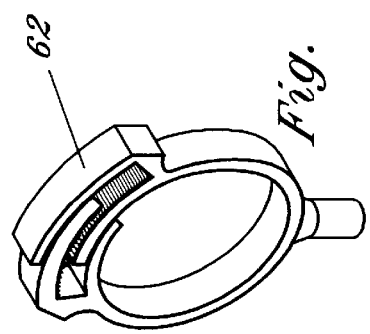

ADJUSTABLE MAGNIFYING APPARATUS

BACKGROUND OF THE INVENTION

1. Field of the Invention

The present invention relates to magnifying devices and, more particularly, to an adjustable magnifying apparatus which is easily adjusted to a desired position and which may be secured to an object near the area to be magnified.

2. Description of the Related Art

With the proliferation of eye diseases and the number of people with deteriorating eyesight, people frequently encounter problems reading small print. To combat this problem, people often obtain prescription eyeglasses.

However, for various reasons, eyeglasses may not be the solution for everyone. For example, obtaining a pair of prescription eyeglasses requires an optometrical examination and the purchase of specially manufactured lenses and a frame. The cost of such a process is sometimes too much for some people and restricts their ability to obtain eyeglasses.

Furthermore, even when people do obtain eyeglasses, certain situations are not amenable to utilizing them. For instance, people with eyeglasses often do not use them when they play golf or other sports, either because they are bothersome when swinging the golf clubs or because they impair their depth perception and, thus, their ability to hit the golf ball.

However, the need to read small print frequently arises in these situations. For example, when playing golf, it is necessary to read the scorecard to determine the rules and regulations of the golf course, the location of restroom facilities and shelters, the layout of the hole, the distance to the green and to keep score. Even people who do wear eyeglasses when playing golf or other sports may still be unable to read small print if they utilize different eyeglasses for distance and reading because the eyeglasses for distance are usually used in such situations. Often times, such people don't carry their reading glasses with them or don't want to keep switching glasses every time they need to read something.

Several magnifying devices have been developed to address similar needs. However, none address the particular need addressed by the present invention. For instance, U.S. Pat. No. 4,603,944 discloses a magnifying device which attaches to an eyeglass frame. Thus, the user must be wearing his eyeglasses to utilize this device.

Another device, shown in U.S. Pat. No. 354,976, discloses a shank assembly having a ball at one end, a U-shaped member at the other end and a compression screw to clamp the jaws of the U-shaped member around the ball. However, this device requires the loosening and tightening of a plurality of screws each time the location of the magnifying lens is adjusted. This process is tedious, time consuming and requires the availability of a screw driver.

Another device, shown in U.S. Pat. No. 5,351,424, discloses a magnifying assembly and needlework frame comprising a flexible tubing connected at one end to a magnifying lens and at the other end to holding means. However, without the improved gripping means of the present invention, the device may slide with respect to the object to which it is attached.

Accordingly, there is still a need in the art for a magnifying apparatus which is easily adjusted to a desired position, which may be maintained over the area to be magnified in a hands-free manner, which may be adequately secured to an object near the area to be magnified and which is inexpensive, easy to assemble and simple to use.

SUMMARY OF THE INVENTION

The present invention is directed towards a new and improved adjustable magnifying apparatus comprising a generally rectangular-shaped, sheetlike magnifying surface, an adjustable arm having at least one generally hourglass-shaped member with a first end zone having a socket and an opposite, generally parabolic-shaped second end zone, a first coupler having a first end with a slit sized and shaped to removably secure an outer edge of the magnifying surface therein and an opposite, parabolic-shaped second end sized and shaped to be removably captured within the socket of one of the hourglass-shaped members, and a generally C-shaped clamp having a second coupler, structured and disposed to removably capture the parabolic-shaped second end zone of one of the hourglass-shaped members therein, mounted on the upper face. The socket, the parabolic-shaped second end zone of the hourglass-shaped members and the parabolic-shaped second end of the first coupler are sized and shaped so that the parabolic-shaped second end zone of one of the hourglass-shaped members and the parabolic-shaped second end of the first coupler may each be removably captured within a socket of one the hourglass-shaped members in such a manner that rotating the parabolic-shaped second end zone of one of the hourglass-shaped members and the parabolic-shaped second end of the first coupler within the sockets of one of the hourglass-shaped members causes the hourglass-shaped members and the first coupler to rotate relative to each other. Alternatively, the adjustable arm may be comprised of a torsional member structured so that the upper and lower ends may be adjustably disposed in angular relation to one another. The C-shaped clamp is structured and disposed to be removably secured to a steering wheel.

It is an object of the present invention to provide a new and improved adjustable magnifying apparatus.

It is another object of the present invention to provide an adjustable magnifying apparatus which is easily adjusted to a desired position.

It is also an object of the present invention to provide an adjustable magnifying apparatus having a magnifying surface which may be maintained over the area to be magnified in a hands-free manner.

It is yet another object of the present invention to provide an adjustable magnifying apparatus which may be secured to an object near the area to be magnified.

It is a further object of the present invention to provide an adjustable magnifying apparatus which is inexpensive, easy to assemble and simple to use.

These and other objects and advantages of the present invention will become more readily apparent in the description which follows.

BRIEF DESCRIPTION OF THE DRAWINGS

For a fuller understanding of the nature of the present invention, reference should be had to the following detailed description, taken in connection with the accompanying drawings in which:

FIG. 1 is a front perspective view of the present invention in unassembled form showing the magnifying surface, the first coupler, the hourglass-shaped members and the C-shaped clamp with the second coupler.

FIG. 2 is a front perspective view of the present invention showing the hourglass-shaped members skewed relative to each other and the first and second couplers.

FIG. 3 is a front perspective view of the present invention showing, the adjustable torsional arm.

FIG. 4 is a perspective view of the C-shaped clamp of the present invention showing the rubber gripping liners and the locking screw.

FIG. 5 is a perspective view of the C-shaped clamp of the present invention showing the rubber gripping liners.

FIG. 6 is a perspective view of the ring clamp with screw lock of the present invention.

FIG. 7 is a perspective view of the suction cup attachment means of the present invention.

FIG. 8 is a perspective view of the ring clamp with channel lock of the present invention.

FIG. 9 is a perspective view of the second coupler of the present invention secured by a screw and nut.

FIG. 10 is a perspective view of the second coupler of the present invention secured by a screw.

FIG. 11 is a perspective view of the magnet attachment means of the present invention.

FIG. 12 is a perspective view of the biased clamp attachment means of the present invention.

FIG. 13 is a perspective view of the snap clamp attachment means of the present invention.

FIG. 14 is a perspective view of the snap tie attachment means of the present invention.

Like reference numerals refer to like parts throughout the several views of the drawings.

DETAILED DESCRIPTION OF THE PREFERRED EMBODIMENT

Referring to FIGS. 1–2, the present invention is directed towards a new and improved adjustable magnifying apparatus comprising a magnifying surface 10, an adjustable arm 20, a first coupler 30 and a clamp 40. The magnifying surface 10 is generally rectangular-shaped and of a flexible, sheetlike configuration.

The adjustable arm 20 includes at least one generally hourglass-shaped member 22. Each hourglass-shaped member 22 includes a first end zone 24, with a socket 26, and an opposite, generally parabolic-shaped second end zone 28. The socket 26 and the parabolic-shaped second end zone 28 are sized and shaped so that the parabolic-shaped second end zone 28 of one of the hourglass-shaped members 22 may be removably captured within a socket 26 of another one of the hourglass-shaped members 22 in such a manner that rotating the parabolic-shaped second end zone 28 of one of the hourglass-shaped members 22 within the socket 26 of another one of the hourglass-shaped members 22 causes the hourglass-shaped members 22 to rotate relative to each other.

The first coupler 30 includes a first end 32 and an opposite, parabolic-shaped second end 34. The first end 32 includes a slit 36 disposed longitudinally across the distal edge 38. The slit 36 is sized and shaped to removably secure an outer edge 12 of the magnifying surface therein. The parabolic-shaped second end 34 is sized and shaped to be removably captured within the socket 26 of one of the hourglass-shaped members 22 in such a manner that rotating the parabolic-shaped second end 34 of the first coupler 30 within the socket 26 of one of the hourglass-shaped members 22 causes the first coupler 30 to rotate relative to the hourglass-shaped member 22.

The clamp 40 is preferably of a generally C-shaped configuration and includes a second coupler 42 mounted on the upper face 44 of the clamp 40. The second coupler 42 is structured The clamp 40 is preferably of a generally C-shaped configuration and includes a second coupler 42 mounted on the upper face 44 of the clamp 40. The second coupler 42 is structured and disposed to removably capture the parabolic-shaped second end zone 28 of one of the hourglass-shaped members 22 therein. The clamp 40 is structured and disposed to be removably secured to an object, such as the steering wheel of a golf cart. As shown in FIGS. 4 and 5, the clamping surface 46 of the C-shaped clamp 40 preferably includes a rubber lining 48 to provide improved gripping ability. Additionally, a screw 49 may be utilized to compress the clamp 40 around the object to which it is being secured, thereby locking the clamp 40 in place.

Alternatively, attachment means other than a C-shaped clamp 40 may be utilized to secure the apparatus to objects of various configurations. For instance, referring now to FIGS. 6–14, the apparatus may be attached to an object using a ring clamp with a screw lock 60 or a channel lock 62, a suction cup 64, a screw 66 and nut 68 or just a screw 70, a magnet 72, a biased clamp 74, a snap clamp 76 or a snap tie 78.

Referring now to FIG. 3 in an alternative embodiment, the adjustable arm 20 comprises a torsional member 50 of a single rod-like configuration. The torsional member 50 is constricted of a flexible material, such as rubber, plastic or metal, and is structured so that the upper 52 and lower 54 ends may be adjustably disposed in angular relation to one another. The torsional member 50 is of the type commonly referred to as flex tubing or gooseneck.

Various changes may be made within the spirit and scope of the invention as described above. For example, the magnifying surface 10 may be secured to the first coupler 30 by an adhesive material or any other securement means. Additionally, the adjustable arm 20 may be comprised of interconnecting elements having a configuration other than the hourglass-shaped members 22 provided for in the preferred embodiment.

What is claimed is:

1. An adjustable magnifying apparatus comprising:

a magnifying surface, an adjustable arm having an upper end and an opposite lower end, first attachment means for securing said magnifying surface to said upper end of said adjustable arm, and second attachment means for securing said lower end of said adjustable arm to an object;

wherein said adjustable arm comprises at least one generally hourglass-shaped member, said hourglass-shaped member including a first end zone having a socket and an opposite generally parabolic-shaped second end zone, said socket being shaped to receive a parabolic structure and said parabolic-shaped second end zone being shaped to fit into a socket.

2. An adjustable magnifying apparatus as recited in claim 1 wherein said magnifying surface includes a generally rectangular-shaped, flexible, sheetlike configuration having an outer edge.

3. An adjustable magnifying apparatus as recited in claim 2, wherein said adjustable arm comprises at least two said generally hourglass-shaped members, said hourglass-shaped members each including said first end zone having a socket and said opposite generally parabolic-shaped second end zone, each said socket and each said parabolic-shaped second end zone being sized and shaped so that said parabolic-shaped second end zone of one of said hourglass-shaped members may be removably captured within said socket of another one of said hourglass-shaped members, whereby rotating said parabolic-shaped second end zone of one of said hourglass-shaped members within said socket of another one of said hourglass-shaped members causes said hourglass-shaped members to rotate relative to each other.

4. An adjustable magnifying apparatus as recited in claim 3 wherein said first attachment means includes a first coupler having a first end with a slit and an opposite generally parabolic-shaped second end, said slit being sized and shaped to removably secure said outer edge of said magnifying surface therein, said parabolic-shaped second end being sized and shaped to be removably captured within said socket of one of said hourglass-shaped members, whereby rotating said parabolic-shaped second end of said first coupler within said socket of said hourglass-shaped member causes said first coupler to rotate relative to said hourglass-shaped member.

5. An adjustable magnifying apparatus as recited in claim 2 wherein said adjustable arm comprises a torsional member, said torsional member being structured so that said upper end and said lower end of said adjustable arm may be adjustably disposed in angular relation to one another.

6. An adjustable magnifying apparatus comprising:
a magnifying surface,
an adjustable arm having an upper end and an opposite lower end,
first attachment means for securing said magnifying surface to said upper end of said adjustable arm, and
second attachment means for securing said lower end of said adjustable arm to an object,
wherein said magnifying surface includes a generally rectangular-shaped, flexible sheetlike configuration having an outer edge,
wherein said adjustable arm comprises a torsional member, said torsional member being structured so that said upper end and said lower end of said adjustable arm may be adjustably disposed in angular relation to one another,
wherein said first attachment means includes a first coupler having a first end with a slit and an opposite cylindrical-shaped second end having a chamber with an opening, said slit being sized and shaped to removably secure said outer edge of said magnifying surface therein, said chamber and said opening being sized and shaped to removably capture said upper end of said adjustable arm therein.

7. An adjustable magnifying apparatus comprising:
a magnifying surface,
an adjustable arm having an upper end and an opposite lower end,
first attachment means for securing said magnifying surface to said upper end of said adjustable arm, and
second attachment means for securing said lower end of said adjustable arm to an object,
wherein said second attachment means includes a generally C-shaped clamp having an upper face and a second coupler mounted on said upper face, said second coupler being structured and disposed for removable interconnection with said lower end of said adjustable arm.

8. An adjustable magnifying apparatus as recited in claim 7 wherein said C-shaped clamp includes a clamping surface with gripping means thereon for fixedly gripping said object.

9. An adjustable magnifying apparatus as recited in claim 8 wherein said gripping means comprises a rubber lining on said clamping surface.

10. An adjustable magnifying apparatus as recited in claim 7 wherein said C-shaped clamp is structured and disposed to be removably secured to a steering wheel.

11. An adjustable magnifying apparatus as recited in claim 7 wherein said second coupler comprises a socket, said socket being sized and shaped to removably capture said parabolic-shaped second end zone of one of said hourglass-shaped members therein.

12. An adjustable magnifying apparatus as recited in claim 7 wherein said second coupler comprises a cylindrical-shaped member having a chamber with an opening, said chamber and said opening being sized and shaped to removably capture said lower end of said adjustable arm therein.

13. An adjustable magnifying apparatus comprising:
a magnifying surface having a generally rectangular-shaped, flexible, sheetlike configuration with an outer edge,
an adjustable arm having an upper end and an opposite lower end,
a first coupler having a first end with a slit and an opposite second end, said slit being sized and shaped to removably secure said outer edge of said magnifying surface therein, said second end being structured and disposed for removable interconnection with said upper end of said adjustable arm, and
attachment means for securing said lower end of said adjustable arm to an object.

14. An adjustable magnifying apparatus as recited in claim 13 wherein said attachment means includes a generally C-shaped clamp having an upper face and a second coupler mounted on said upper face, said second coupler being structured and disposed for removable interconnection with said lower end of said adjustable arm.

15. An adjustable magnifying apparatus as recited in claim 14 wherein said C-shaped clamp includes a clamping surface with gripping means thereon for fixedly gripping said object.

16. An adjustable magnifying apparatus as recited in claim 15 wherein said gripping means comprises a rubber lining on said clamping surface.

17. An adjustable magnifying apparatus as recited in claim 14 wherein said C-shaped clamp is structured and disposed to be removably secured to a steering wheel.

18. An adjustable magnifying apparatus as recited in claim 13, wherein said adjustable arm comprises at least two generally hourglass-shaped members, said hourglass-shaped members each including a first end zone having a socket and an opposite generally parabolic-shaped second end zone, each said socket and each said parabolic-shaped second end zone being sized and shaped so that said parabolic-shaped second end zone of one of said hourglass-shaped members may be removably captured within said socket of another one of said hourglass-shaped members, whereby rotating said parabolic-shaped second end zone of one of said hourglass-shaped members within said socket of another one of said hourglass-shaped members causes said hourglass-shaped members to rotate relative to each other.

19. An adjustable magnifying apparatus as recited in claim 13 wherein said adjustable arm comprises a torsional member, said torsional member being structured so that said upper end and said lower end of said adjustable arm may be adjustably disposed in angular relation to one another.

20. An adjustable magnifying apparatus comprising:
a magnifying surface having a generally rectangular-shaped, flexible, sheetlike configuration with an outer edge, an adjustable arm having at least two generally hourglass-shaped members, each of said hourglass-shaped members including a first end zone having a socket and an opposite generally parabolic-shaped second end zone, said socket and said parabolic-shaped second end zone being sized and shaped so that said parabolic-shaped second end zone of one of said hourglass-shaped members may be removably captured within said socket of another one of said hourglass-shaped members, whereby rotating said parabolic-shaped second end zone of one of said hourglass-shaped members within said socket of another one of said hourglass-shaped members causes said hourglass-shaped members to rotate relative to each other, a first coupler having a first end with a slit and an opposite parabolic-shaped second end, said slit being sized and shaped to removably secure said outer edge of said magnifying surface therein, said parabolic-shaped second end being sized and shaped to be removably captured within said socket of one of said hourglass-shaped members, whereby rotating said parabolic-shaped second end of said first coupler within said socket of said one of said hourglass-shaped members causes said first coupler to rotate relative to said one of said hourglass-shaped members, and a generally C-shaped clamp having an upper face and a second coupler mounted on said upper face, said second coupler being structured and disposed to removably capture said parabolic-shaped second end zone of one of said hourglass-shaped members therein.

21. An adjustable magnifying apparatus as recited in claim 20 wherein said C-shaped clamp includes a clamping surface with gripping means thereon for fixedly gripping said object.

22. An adjustable magnifying apparatus as recited in claim 21 wherein said gripping means comprises a rubber lining on said clamping surface.

23. An adjustable magnifying apparatus as recited in claim 20 wherein said C-shaped clamp is structured and disposed to be removably secured to a steering wheel.

24. An adjustable magnifying apparatus comprising:

a magnifying surface having a generally rectangular-shaped, flexible, sheetlike configuration with an outer edge, an adjustable torsional arm having an upper end and an opposite lower end, said torsional arm being structured so that said upper end and said lower end may be adjustably disposed in angular relation to one another, a first coupler having a first end with a slit and an opposite cylindrical-shaped second end with a chamber and an opening, said slit being sized and shaped to removably secure said outer edge of said magnifying surface therein, said chamber and said opening being sized and shaped to removably capture said upper end of said adjustable torsional arm therein, and a generally C-shaped clamp having an upper face and a second coupler mounted on said upper face, said second coupler being structured and disposed for removable interconnection with said lower end of said adjustable torsional arm.

25. An adjustable magnifying apparatus as recited in claim 24 wherein said C-shaped clamp includes a clamping surface with gripping means thereon for fixedly gripping said object.

26. An adjustable magnifying apparatus as recited in claim 25 wherein said gripping means comprises a rubber lining on said clamping surface.

27. An adjustable magnifying apparatus as recited in claim 24 wherein said C-shaped clamp is structured and disposed to be removably secured to a steering wheel.

* * * * *